(12) United States Patent
Potta et al.

(10) Patent No.: US 12,732,658 B1
(45) Date of Patent: Sep. 8, 2026

(54) INTERFERENCE MITIGATION FOR WIRELESS DATA TRANSMISSION

(71) Applicant: Amazon Technologies, Inc., Seattle, WA (US)

(72) Inventors: Srikar Potta, San Diego, CA (US); Santhosh Kumar Vojjala, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 243 days.

(21) Appl. No.: 18/758,549

(22) Filed: Jun. 28, 2024

(51) Int. Cl.
*H04N 21/4363* (2011.01)
*H04N 21/41* (2011.01)
*H04N 21/422* (2011.01)
*H04N 21/647* (2011.01)

(52) U.S. Cl.
CPC ... *H04N 21/43637* (2013.01); *H04N 21/4104* (2013.01); *H04N 21/42204* (2013.01); *H04N 21/64738* (2013.01)

(58) Field of Classification Search
CPC ......... H04N 21/43637; H04N 21/4104; H04N 21/42204; H04N 21/64738
See application file for complete search history.

(56) References Cited

U.S. PATENT DOCUMENTS 10,075,140 B1 * 9/2018 Dietrich ............... H03G 3/3089
2015/0379997 A1 * 12/2015 Peterson .............. H04N 19/154 375/240.02
2023/0035128 A1 * 2/2023 Barscevicius ........... G06F 3/165
2023/0103596 A1 * 4/2023 Chundi ................. G06F 3/0482 715/716
2025/0287216 A1 * 9/2025 Shivamurthy ........ H04W 16/14

* cited by examiner

*Primary Examiner* — Oschta I Montoya
(74) *Attorney, Agent, or Firm* — Pierce Atwood LLP

(57) ABSTRACT

A media playback system may include features for mitigating interference. The media playback system may include a display device such as a smart TV that wirelessly transmits audio data to one or more listening devices such as earbuds, headphones, etc. The media playback system may include a remote control that can communicate using the same or similar frequencies and/or channels used for transmitting audio data. The media playback system may therefore use the radio(s) of the remote control to measure interference as a position removed from the smart TV and potentially closer to the listening device. This measurement may better reflect the listening device's ability to receive data packets reliably than a measurement of interference taken only at the location of the smart TV.

20 Claims, 8 Drawing Sheets

System 100
Listening device 112
Audio 15
User 5
114a
Smart TV 110a
I/O Limited Device(s) 110e
Network(s) 199
System Component(s) 120
114b
RC 130
114d
Smart Watch 110c
114c
Smart Phone 110b
Wireless AP 140

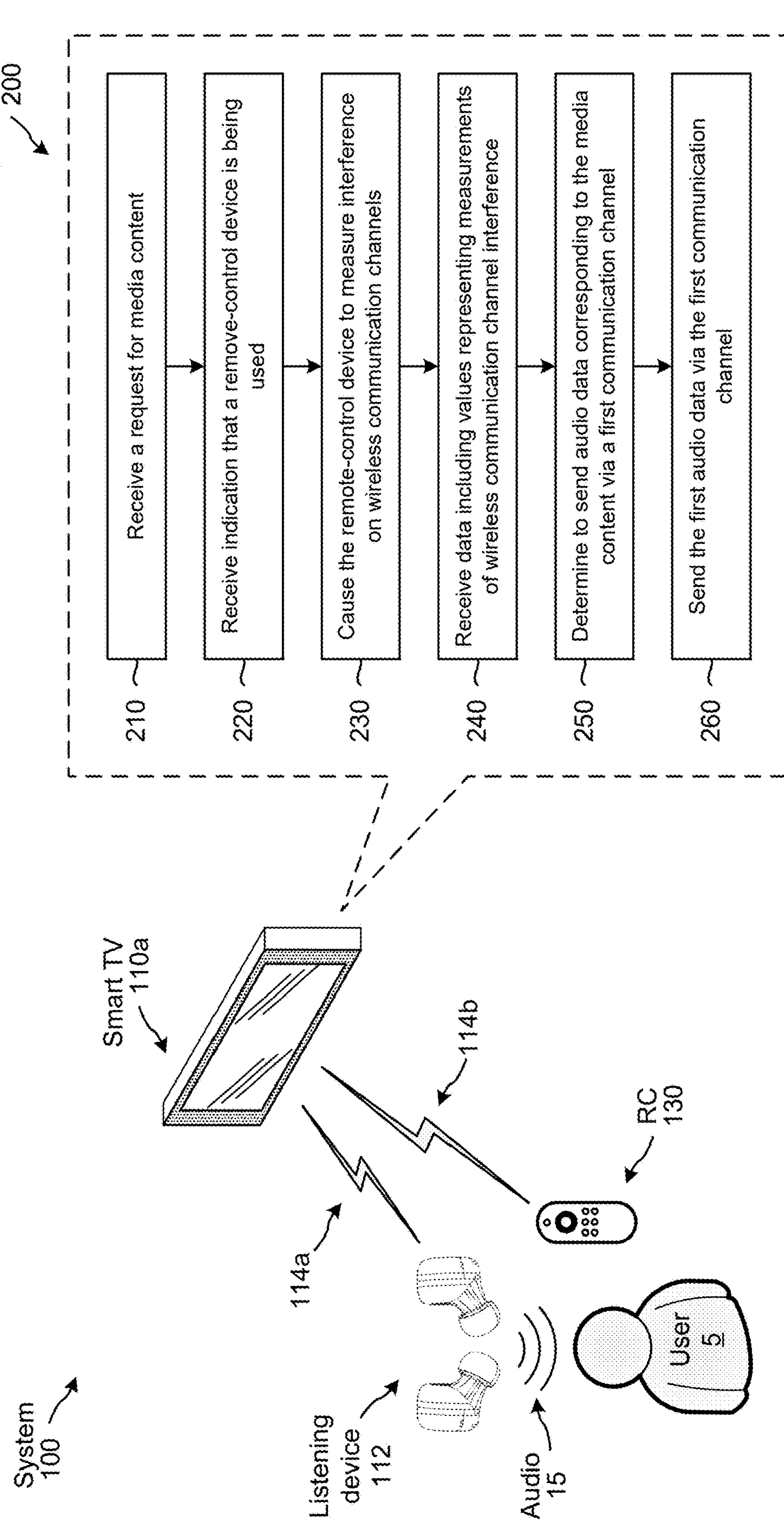
FIG. 2
Operations 200
210 Receive a request for media content
220 Receive indication that a remove-control device is being used
230 Cause the remote-control device to measure interference on wireless communication channels
240 Receive data including values representing measurements of wireless communication channel interference
250 Determine to send audio data corresponding to the media content via a first communication channel
260 Send the first audio data via the first communication channel
Smart TV 110a
114b
114a
RC 130
System 100
Listening device 112
Audio 15
User 5

-50dBm
-70dBm
-90dBm
Marginal SNR
Some pkt loss
Marginal SNR
Some pkt loss
Marginal SNR
Some pkt loss
Good SNR
Good SNR
Good SNR
Good SNR
Channel:
37 0 1 2 3 4 5 6 7 8 9 38 10 12 13 14 15 16 17 18 19 20 21 22 23 24 25 26 27 28 29 30 31 32 33 34 35 36 39
Freq (MHz):
2402 2410 2420 2430 2440 2450 2460 2470 2480

-50dBm
-70dBm
-90dBm
Good SNR
Good SNR
Good SNR
Good SNR
Poor SNR
Lost Packets
Poor SNR
Lost Packets
Poor SNR
Lost Packets
Channel:
37 0 1 2 3 4 5 6 7 8 9 38 10 12 13 14 15 16 17 18 19 20 21 22 23 24 25 26 27 28 29 30 31 32 33 34 35 36 39
Freq (MHz):
2402 2410 2420 2430 2440 2450 2460 2470 2480

System 100
System Component(s) 120
Network(s) 199
Smart TV 110a
114a
114b
RC 130
Listening device 112
Audio 15
User 5
Media Storage 525
Media Service Component 530
Media Content Manager 560
Audio Manager 540
Audio Port 1
Audio Port 2
...
Bluetooth Service Component 550
Bluetooth Host 570
Data Port 1
Data Port 2
...
Bluetooth Controller 580
Audio Data 585
Metadata 587

FIG. 6

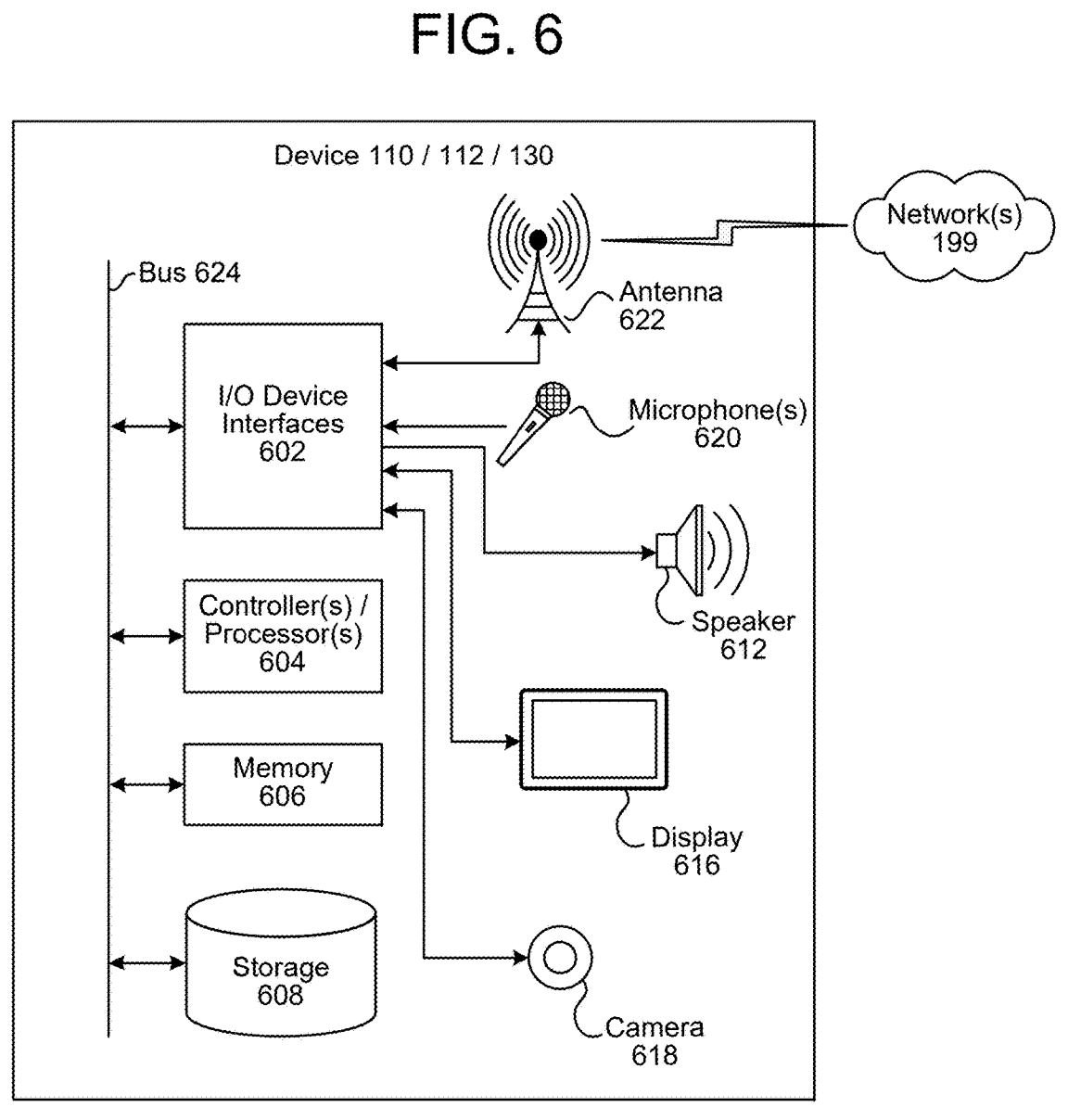

Device 110 / 112 / 130

Network(s) 199

Bus 624

Antenna 622

I/O Device Interfaces 602

Microphone(s) 620

Speaker 612

Controller(s) / Processor(s) 604

Memory 606

Display 616

Storage 608

Camera 618

FIG. 7

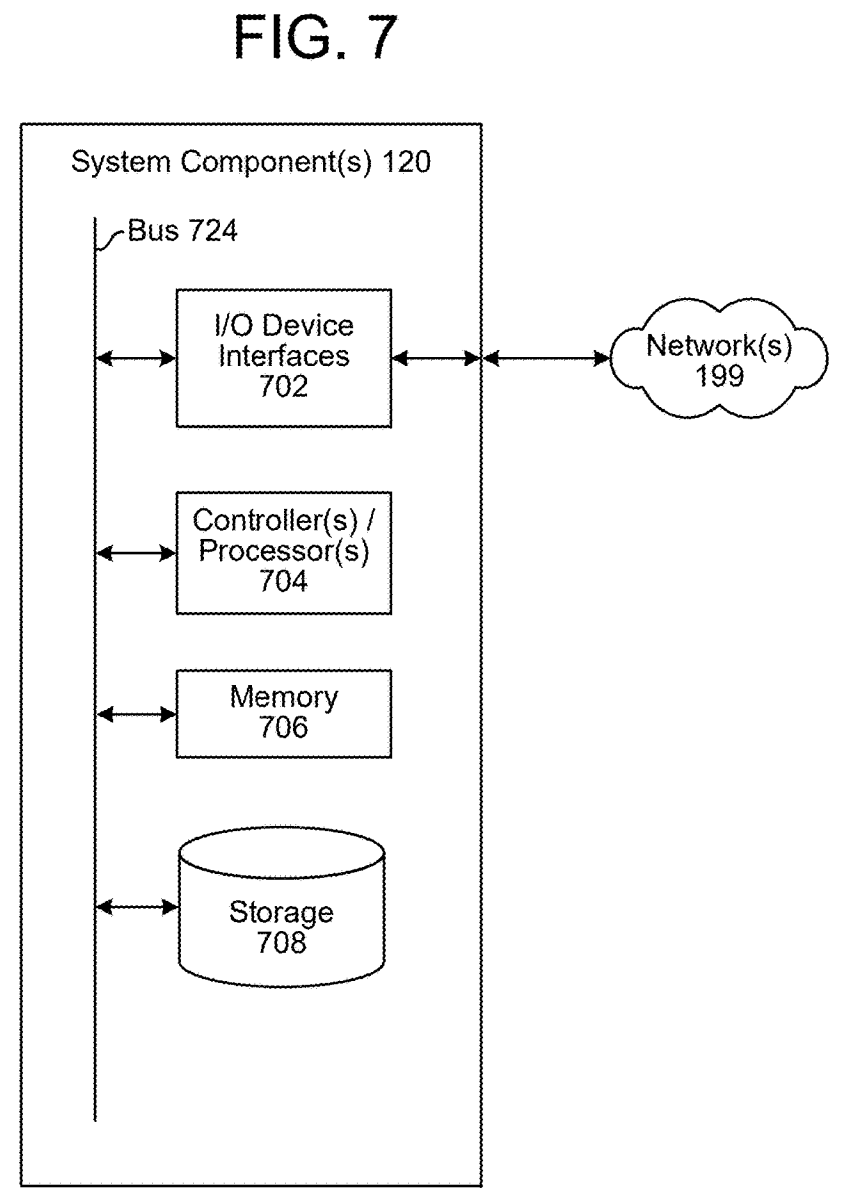

Network(s) 199

System Component(s) 120

I/O Device Interfaces 702

Controller(s) / Processor(s) 704

Memory 706

Storage 708

Bus 724

INTERFERENCE MITIGATION FOR WIRELESS DATA TRANSMISSION

BACKGROUND

Listening devices, such as earbuds, headphones, headsets, and/or other devices may be used to output audio using one or more speakers and, in some cases, capture audio using a microphone. The listening device may be configured to communicate via a wired and/or wireless connection with a personal device (e.g., a smart TV, a smartphone, laptop, etc.) and/or a one-to-many broadcast device (e.g., associated with a television, theater, conference facility, sports stadium, etc.). The listening device may receive audio data from the source device and output the corresponding audio. The audio may include, for example, music, sound effects, and/or speech from a movie, concert, meeting, sporting event, etc.

BRIEF DESCRIPTION OF DRAWINGS

For a more complete understanding of the present disclosure, reference is now made to the following description taken in conjunction with the accompanying drawings.

FIG. 2 illustrates example operations of a media playback device implementing interference mitigation, according to embodiments of the present disclosure.

FIG. 6 is a block diagram conceptually illustrating example components of a device, according to embodiments of the present disclosure.

FIG. 7 is a block diagram conceptually illustrating example components of a system, according to embodiments of the present disclosure.

DETAILED DESCRIPTION

Figure 1:
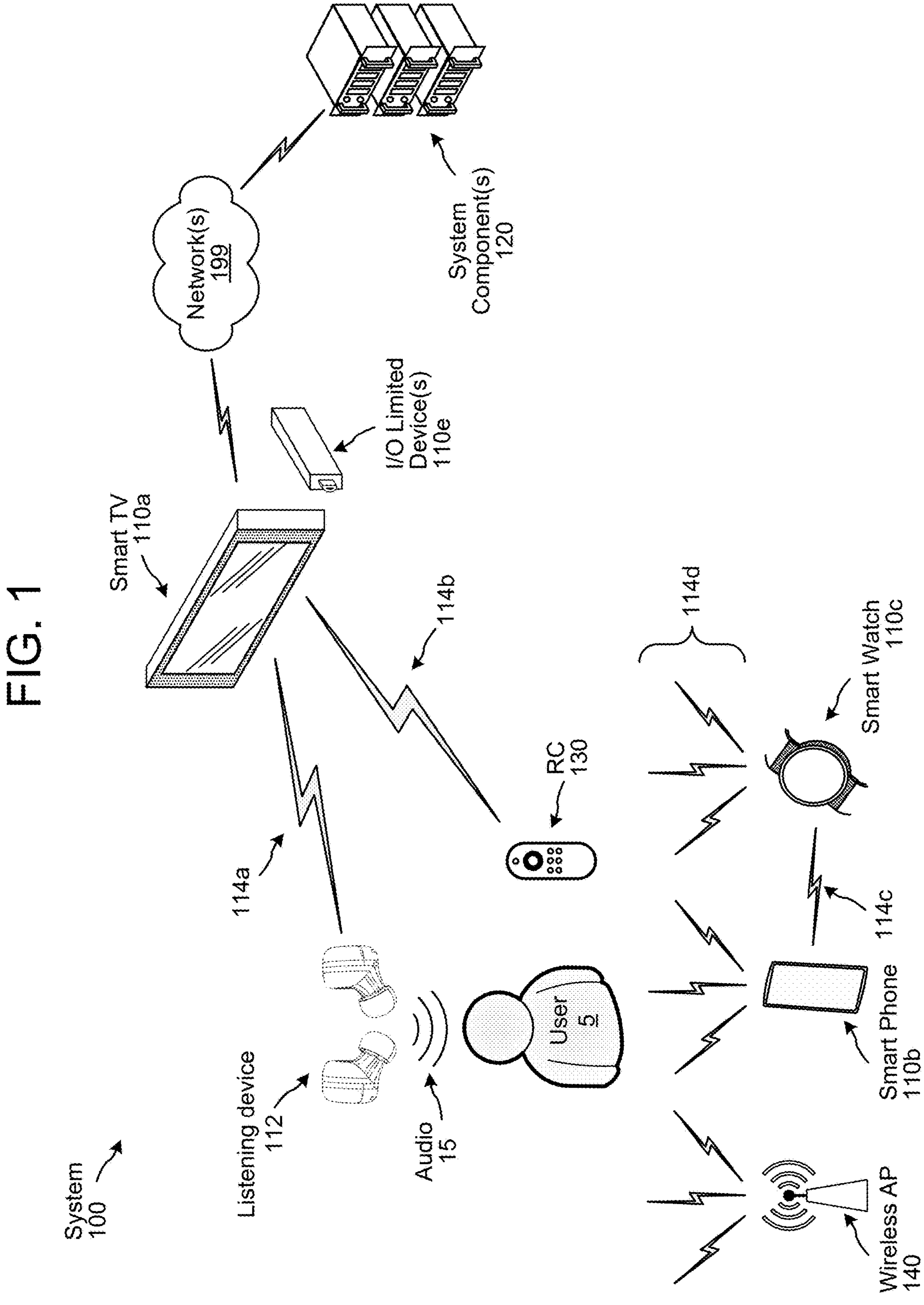
FIG. 1 illustrates a system implementing interference mitigation for wireless audio transmission, according to embodiments of the present disclosure.

Personal audio output devices (e.g., "audio output devices" or "listening devices") may be carried and/or worn by a user to improve the listening experience and/or increase privacy associated with playback of audio data. Listening devices may include earphones (e.g., which may include different types of headphones and earbuds), hearing aids, speakers (e.g., for outputting audio to a room or open area), bone-conduction headphones (e.g., for transmitting audio through bones in a user's skull instead of their ear canal), etc. Headphones may include over-ear and on-ear types, and may be open-back or closed-back. Earbuds may include in-ear types, which may form a seal within the ear canal, and "open" or "classic" earbuds, which may form only a partial seal or no seal with the ear canal. Speakers may include wireless and/or portable speakers for personal listening, as well as desk/floor/wall-mounted speakers, studio monitors, etc.).

Listening devices may be used to audio data from another device; e.g., using one or more wireless communication protocols such as Bluetooth Classic Audio, which operates on the Bluetooth Classic radio, and/or Bluetooth Low Energy (BLE) Audio, which operates on the BLE radio. BLE Audio offers LE Isochronous Channels, which enables Multi-Stream Audio and Broadcast Audio. Multi-Stream Audio involves a point-to-point bidirectional communication protocol with acknowledgment, and enables transmission of multiple, independent, synchronized audio streams between an audio device such as smartphone and one or more listening devices (e.g., a one-to-one wireless protocol). Broadcast Audio (e.g., Bluetooth Auracast broadcast audio) enables an audio source device to broadcast one or more audio streams to an unlimited number of listening devices (e.g., a one-to-many wireless protocol). Broadcast Audio involves a one-to-many broadcast packet transportation mechanism without acknowledgment.

Wireless transmission of data may be subject to interference. The interference may include transmission on the same and/or adjacent wireless channels, electromagnetic noise (e.g., from power convertors, electric motors, etc.), and the like. Some wireless data transmission protocols such as BLE Audio may have several to many channels to select from. A transmitting device (e.g., a media playback device such as a smart TV) may use its radio to determine which of the available channel(s) are free from interference or have lower interference, and select the channel(s) with low interference for potentially sending audio data.

In some cases, however, the transmitting device may select a channel for which it measures relatively low interference, but which may be experiencing high interference at the listening device. For example, the listening device may be across a room from the transmitting device, but close in proximity to one or more other device transmitting data on the same or adjacent channel (or otherwise emitting noise). Thus, while the transmitting device may determine that a particular channel is free of interference, the listening device may experience a level of interference significant enough to cause data packet loss and a corresponding reduction in audio quality.

Offered herein are techniques for mitigating interference in wireless data transmission. The techniques may involve measuring interference using a radio that is (presumably) in proximity to the receiving device. In other words, the measuring device and the receiving device may be closer to each other than either or both of them are from the transmitting device. For example, the measuring device may be a remote-control device associated and/or in communication with the media playback device. The remote-control device may communicate with the media playback device for purposes of allowing user control over settings and functions of the media playback device. The remote-control device may include one or more radios for communicating at the same frequencies and/or channels that the media playback device uses for transmitting audio data. The remote-control device may, in many cases, be in relatively close proximity to the listening device(s). Thus, the remote-control device may measure interference using its radio(s), and send those measurements to the media playback device, which can use those measurements to determine which channels to include or exclude from potential use for transmitting audio data. In some cases, the media playback device may take interference measurements using its own radio(s), and use both its and the remote-control device's measurements to select frequencies/channels for transmitting audio data.

The system may use the interference measurements in several ways to select channels for potentially transmitting data. In some implementations, the system may use threshold-based selection. For example, the system may exclude any channels having a measured interference over-50 decibels-milliwatts (dBm). In various cases, other thresholds may be used. If no channels are measured to have less than the threshold level of interference, the system may switch to rank-based selection. For example, the system may select the channel or channels (e.g., 2, 3, 4, 5, etc.) with the lowest measured interference. In some cases, the system may operate using rank-based selection without applying a threshold. For example, the system may rank the channels in order of measured interference and select a certain number, proportion, percentile of channels for potential use in transmitting audio data. The system may repeat measurements occasionally and update the channel selection accordingly.

These and other features of the disclosure are provided as examples, and may be used in combination with each other and/or with additional features described herein. The systems and methods may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 implementing interference mitigation for wireless audio transmission, according to embodiments of the present disclosure. The system 100 may include a media playback device such as a smart TV 110*a*. In some cases, the media projection device may be a display with an I/O limited user device 110*e* that may be used for streaming broadcast and/or on-demand media content. For example, the smart TV 110*a* may be an Amazon FireTV or the like. The I/O limited user device 110*e* may be an Amazon FireTV Stick or the like. In various implementations, the system 100 may include other media playback devices such as one of the user device 110 shown in FIG. 8. When functions of a media playback device such as the smart TV 110*a* are described herein, such description may apply to other media playback devices such as the I/O limited user device 110*e* and/or any other user device 110 unless otherwise specified. The smart TV 110*a* may be used to stream (e.g., request and receive for playback) media content from one or more system component(s) 120 via a computer network 199. The smart TV 110*a* may, in addition to playing back video on a display, may wirelessly transmit audio data to one or more listening device 112. Thus, a user 5 may request media content for playback on the smart TV 110*a* and/or I/O limited user device 110*e* and listen to the corresponding audio via the listening device 112. In some cases, the user 5 may operate the smart TV 110*a* using a remote-control device (RC) 130. An example hardware implementation of a smart TV 110*a*, listening device 112, and/or RC 130 is described below with reference to FIG. 6. An example hardware implementation of a system component 120 is described below with reference to FIG. 7.

In some implementations, the system 100 may transmit audio data via a Bluetooth protocol; for example, Bluetooth Classic or BLE Audio. As used herein, both "send" and "transmit" may refer to the act of outputting electromagnetic radiation conveying audio data in various formats, with or without a handshake, acknowledgment, and/or encryption. A one-to-one wireless protocol may refer to a connection-based protocol between two devices. The one-to-one protocol may include a handshake to open the connection and may additionally include encryption of data sent and/or acknowledgement of data received. Bluetooth Classic Audio is an example of a one-to-one wireless protocol, as is a BLE connected isochronous stream (CIS). A one-to-many wireless protocol may refer to a protocol in which one device "broadcasts" data; for example, to any other device that may receive it or to no device at all, and generally without a handshake or acknowledgement. Bluetooth Low Energy Auracast is an example of a one-to-many wireless protocol.

In Auracast, the system 100 may transmit audio data, but may lack a mechanism to determine whether a receiver receives the data packets because there may not be a back channel to report acknowledgements (ACKs) or negative acknowledgements (NACKs). In some cases, a back channel may be implemented if the transmitting device (e.g., the smart TV 110*a*) and the receiving device (e.g., the listening device 112) are under common control. In many case, however, transmitting devices and receiving devices may be unable to open a back channel for returning ACK and/or NACK indications. In some cases, to avoid packet loss, a system may transmit multiple copies data packets; however, this increases power consumption, interference to neighboring devices, and the airtime (e.g., preventing other some or all other use of a shared channel). A BLE CIS may include a back channel to report ACKs/NACKs, but the information returned to the transmitting device only reports only which data packets were received or lost. However, these and other wireless protocols may not have any mechanism for the receiving device to indicate which frequencies/channels may be experiencing higher interference.

As mentioned previously, wireless transmission of data may be subject to interference. The transmitting device may use its radio to determine which of the available channel(s) are free from interference or have lower interference, and select the channel(s) with low interference for potentially sending audio data. In some cases, however, the transmitting device may select a channel for which it measures relatively low interference, but which may be experiencing high interference at the listening device. For example, in the example environment shown in FIG. 1, the user 5 is watching the smart TV 110*a* and listening to audio 15 emitted by the listening device 112. The smart TV 110*a* may send audio data to the listening device via a wireless signal 114*a*. The user 5 and listening device 112 may, however, be in proximity to another device that may be emitting interference signal 114*d*. For example, the user 5 may have a smart phone 110*b* in communication with a smart watch 110*c* via wireless signal 114*c*. In some cases, the wireless signal 114*c* may be in the same frequency band as the wireless signal 114*a* conveying the audio data to the listening device 112; for example, both wireless signals 114*a* and 114*c* may be BLE signals. In such cases, the signals emitted by the smart phone 110*b* and/or smart watch 110*c* may result in interference signals 114*d* that interfere with the wireless signal 114*a*. In another example, a wireless access point (AP) 140 may also emit an interference signal 114*d* within the frequency range of wireless communication between the smart TV 110*a* and the listening devices 112. A wireless AP 140 may emit an interference signal 114*d* of sufficient amplitude to interfere with reception by the listening device 112, even if separated by a wall. And because the distance between the smart TV

110*a* and the listening device 112 is greater than the distance between the listening device 112 and the wireless AP 140, smart phone 110*b*, and/or smart watch 110*c*, a measurement of interference by the smart TV 110*a* may not reflect the amount of interference experienced at the listening device 112. Thus, while the smart TV 110*a* may determine that a particular channel is free of interference, the listening device 112 may experience a level of interference significant enough to cause data packet loss and a corresponding reduction in audio quality.

The system 100 may leverage the RC 130 to mitigate the deleterious effects of interference as described herein. Many media playback devices may include or be associated with a remote-control device such as the RC 130 shown in FIG. 1. An RC 130 may be a handheld, electronic device physically separate and distinct from, but in communication with, the media playback device (e.g., the smart TV 110*a* and/or one or more of the other user devices 110 described herein). The user 5 may use the RC 130 to operate the smart TV 110*a* to, for example, configure settings, request media content, control playback of the media content, etc. In various implementation, the RC 130 may accept input from the user 5 in various ways; for example, the RC 130 may have one or more buttons or switches, a microphone for receiving voice commands, accelerometers and/or an inertial measurement unit (IMU) for detecting gestures and/or for allowing the user 5 to "point" the RC 130 at the smart TV 110*a* to move a cursor on a display of the smart TV 110*a*, etc.). The RC 130 may convert these inputs into data that it may send to the smart TV 110*a*, which may perform one or more actions responsive to the data. The RC 130 may communicate with the smart TV 110*a* via a wired and/or wireless connection (e.g., via wireless signals 114*b*). Communication between the RC 130 and smart TV 110*a* may be constant or intermittent (e.g., when the user 5 provides an input to the RC 130). The communication may be one-way (e.g., the RC 130 may transmit data representing the user inputs to the smart TV 110*a* without handshake/acknowledgement) and/or two-way (e.g., the RC 130 and smart TV 110*a* may exchange data). Wired connections may include universal serial bus (USB) or ethernet connections. Wireless communication may occur via infrared (IR) signals and/or one or more standard wireless communication protocols such as Bluetooth, BLE, or the like, and/or a proprietary wireless communication protocol. The smart TV 110*a* may receive data from the RC 130, process user inputs as appropriate, and respond and/or perform a requested action. In some implementations, the RC 130 and the smart TV 110*a* may be sold together and/or preconfigured to operate with each other (e.g., with preset commands). In some implementations, the RC 130 may be sold separately from the smart TV 110*a* and configured (e.g., by the user 5) to operate with the smart TV 110*a*. In some implementations, the smart TV 110*a* may send data to the RC 130 for the purpose of controlling certain functions of the RC 130 related to receiving inputs, transmitting data back to the smart TV 110*a*, and/or providing outputs to the user 5 from the RC 130 itself.

Unlike with listening devices 112, the RC 130 and smart TV 110*a* may be under common control (e.g., made and/or sold by the same entity). In some cases, the smart TV 110*a* may communicate with the RC 130 (and vice-versa) via a Bluetooth protocol such as BLE. Accordingly, the RC 130 may include one or more radios configured to communicate over the same frequencies and/or channels that the smart TV 110*a* may use to transmit audio data. The system 100 may therefore use the RC 130 to measure channel interference at a second location removed from the smart TV 110*a*, and report those measurements back to the smart TV 110*a* (e.g., via wireless signals 114*b*). In many cases, the RC 130 may be in close proximity to the listening device 112 (e.g., on or within reach of the user 5). The smart TV 110*a* may use the interference measurements made by the RC 130 to select a channel or channels for transmitting audio data to the listening device 112 (e.g., whether by a one-to-one or one-to-many protocol). In some cases, the smart TV 110*a* may measure interference using its own radio(s), and use both measurements to select the channel(s). In some implementations, the system 100 may determine which channels to include in a subset of channels for potentially transmitting audio data (e.g., other components may select from and/or frequency hop between the subset of channels when transmitting audio data). In some implementations, the system 100 may determine which channels to exclude from use in transmitting audio data.

In some implementations, the system 100 may use a threshold-based selection. For example, the smart TV 110*a* may exclude any channels having a measured interference over a certain level. The threshold level may be predetermined, a configurable parameter, and/or a self-adjusting value adjusted based on operating conditions. In various implementations, the threshold value may be set to −65 dBm, −60 dBm, −45 dBm, −55 dBm, −50 dBm, or other appropriate threshold. In some implementations, the threshold may depend on duty cycle. For example, a duty cycle of 1% high noise may not result in a lot of data packet loss, and a duty cycle of 35%-45% may cause a noticeable reduction in audio quality. A 62% duty cycle represents the 99th percentile of duty cycles typically observed. Some devices may be validated at this duty cycle for certain wireless communication protocols For example, if the available airtime on a particular channel is relatively low (e.g., representing a high duty cycle of use by other devices/processes), the system 100 may impose a lower noise threshold (e.g., excluding channels having a measured interference over −55 dBm). If the available airtime is relatively high (e.g., representing a lower duty cycle of other use), the system may impose a higher noise threshold (e.g., excluding channels having a measured interference over −45 dBm). Some communications regulations (e.g., as promulgated by the Federal Communications Commission (FCC)) require that at least 2 channels be operations; thus, if the smart TV 110*a* determines that no channels have a measured interference below the threshold, the system 100 may select the channel or channels (e.g., 2, 3, 4, etc., channels) having the lowest measured interference.

In some implementations, the system 100 may use rank-based selection. The system 100 may rank the channels in order of measured interference. The system 100 may exclude a certain number, proportion, percentile, etc., of channels from potential use in transmitting audio data. For example, the system 100 may select the channels corresponding to the N lowest interference measurements, or the channels corresponding to below the 25th percentile of interference measurements.

In some implementations, the system 100 may repeat the interference measurements periodically, occasionally, and/or on-demand. For example, the system 100 may repeat interference measurements and channel selection every few seconds, minutes, etc. The system 100 may repeat interference measurements and channel selection in response to various triggers (e.g., exceeding a packet loss threshold, receiving a new request for media content, etc.). The system 100 may repeat interference measurements and channel selection based on reports of a threshold number of dropped packets on that channel over a period of time, or a threshold number of dopped packets total since the channel(s) was/were selected and/or since the last interference measurement.

FIG. 2 illustrates example operations 200 of the smart TV 110*a* implementing interference mitigation, according to embodiments of the present disclosure. Although FIG. 2 illustrates the smart TV 110*a* performing the operations 200, in various implementations, the operations 200 may be performed by other media playback devices such as the I/O limited user device 110*e* and/or one or more of the user devices 110 shown in FIG. 8. In some implementations, the operations 200 may be performed by a single device and/or by two or more devices working together; for example, the smart TV 110*a* may perform some of the operations 200 while the RC 130 and/or system component(s) 120 may also perform some of the operations 200. In various implementations, the operations 200 may include more, fewer, and/or different steps/stages than those shown in FIG. 2, with some of the operations 200 being performed by more than one device, in parallel, and/or in an order other than that shown in FIG. 2.

The operations 200 may include receiving (210), by the smart TV 110*a*, a first request for media content such as streaming and/or downloadable audio or multimedia content. The media content may include or be associated with audio data. In some implementations, the operations 200 may include receiving (220), by the smart TV 110*a*, an indication that an RC 130 is being used. If the smart TV 110*a* receives such an indication, for example, by receiving a user input from the RC 130 (e.g., including motion detected by the IMU) and/or receiving a beacon signal or a response to a ping from the RC 130, the operations 200 may include causing (230) the RC 130 to measure interference corresponding to at least a first wireless communication channel and a second wireless communication channel (e.g., by sending from the smart TV 110*a* to the RC 130 an instruction to perform an interference measurement protocol).

The operations 200 may include receiving (240), from the RC 130, first data including at least a first value representing a first measurement of interference corresponding to a first wireless communication channel and a second value representing a second measurement of interference corresponding to a second wireless communication channel. The operations 200 may include determining (250), based on at least the first data, to send the audio data corresponding to the media content via the first wireless communication channel (e.g., via a wireless signal 114*a*). The operations 200 may include sending (260) the first audio data via the first wireless communication channel (e.g., to one or more listening devices 112).

Figure 3:
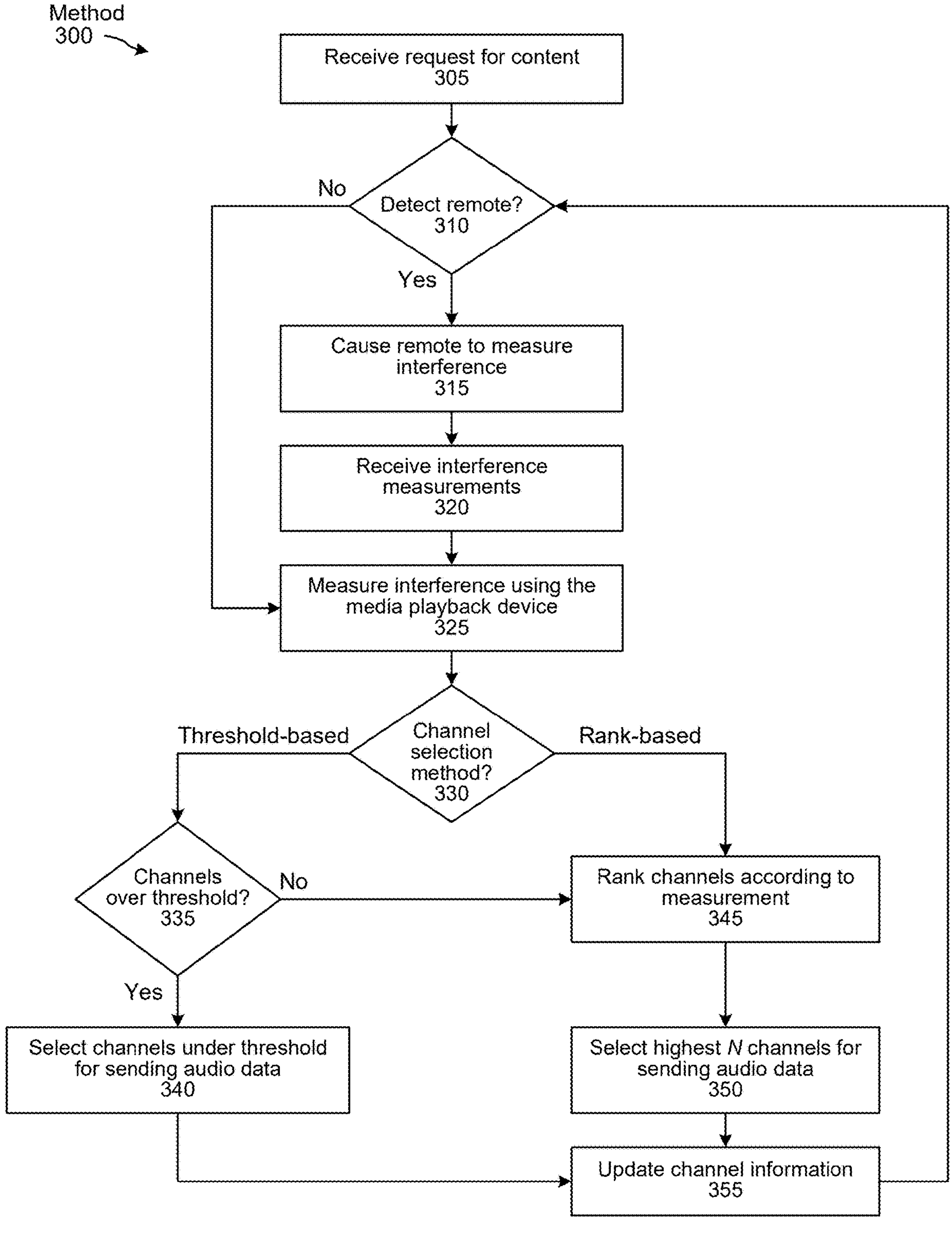
FIG. 3 is a flowchart illustrating an example method of interference mitigation, according to embodiments of the present disclosure.

FIG. 3 is a flowchart illustrating an example method 300 of interference mitigation, according to embodiments of the present disclosure. The method 300 may be performed by the system 100; for example, using a media playback device such as a smart TV 110*a* and an RC 130. The method 300 is not so limited, however, and the operations described may be performed additionally or alternatively using one or more of the other user devices 110 described herein. The method 300 may include receiving (305) a request for media content. The media content may be, for example, streamable digital audio content such as a podcast or music, and/or multimedia content such a movie, television show, etc. The request may be received by the smart TV 110*a* (and/or other playback device). The smart TV 110*a* may have the media content stored locally and/or may request the content from one or more system components 120.

The method 300 may include detecting (310) a remote-control device (e.g., the RC 130). The system 100 may detect the RC 130 if/when, for example, the user 5 uses it to request the media content. The system 100 may detect the RC 130 based on some other user input such as a button press, a voice input, and/or movement detected by the IMU. The system 100 may detect the RC 130 by sending, from the smart TV 110*a*, a signal requesting a response from the RC 130. The system 100 may detect the RC 130 by detecting a periodic beacon signal from the RC 130. If the system 100 does not detect a remote-control device ("no" at 310), the method 300 may proceed to a stage 325 and perform interference measurement at the media playback device (e.g., using the radio(s) of the media playback device).

If the system 100 does detect the RC 130 ("yes" at 310), the method 300 may include causing (315) the RC 130 to measure interference. The RC 130 may use its radio(s) to measure interference at one or more channels that the smart TV 110*a* may use to transmit audio data. The RC 130 may measure the interference at a channel in, for example, decibel-milliwatts (dBm). For example, channels measured to have less than −50 dBm of interference may carry packets with relatively little or no packet loss, while channels measured to have greater than −50 dBm of interference may experience packet loss that increases with increasing interference until the quality of audio begins to suffer, with the channel eventually becoming unusable. The method 300 may include receiving (320) the interference measurement (s) from the RC 130. In some implementations, the method 300 may also include measuring (325) interference locally, using the radio(s) of the smart TV 110*a*. In some implementations, however, the local interference may be disregarded (e.g., as less critical to data reception at the listening device 112) and/or subject to a higher threshold than interference measurements taken by the RC 130.

The method 300 may include selecting channels for potentially transmitting data using one or more techniques; for example, the system 100 may, at a stage 330, proceed with a threshold-based channel selection technique or a rank-based channel selection technique (in some cases, however a combination of those techniques may be used as described below). Using threshold-based channel selection, the method 300 may include determining (335) whether any channels have interference measurements below the interference threshold value (e.g., −50 dBm or the like). In some cases, the system 100 may be configured to provide at least 3 (or some other number) of channels for potentially transmitting data. If the system 100 identifies an adequate number of channels having interference measurements below the threshold value ("yes" at 335), the method 300 may include selecting (340) the channel(s) under the threshold for potentially transmitting audio data. The system may select multiple channels (e.g., a subset of the available channels) for transmitting the data. During transmission, the smart TV 110*a* or other transmitting device may channel hop or frequency hop between channels of the subset. Thus, the smart TV 110*a* may transmit a first portion of the data via a first channel of the subset, a second portion of the data via a second channel of the subset, and so on, cycling through the channels of the subset. In some implementations, the method 300 may include updating (355) the channel information from time to time by repeating one or more of the previous stages. The system may update the channel information from time to time. This may allow the system to select different channels for transmitting data if the channels previously use begin experiencing interference. While updating channel information more often may better prevent data packet loss due to newly arising interference signals, taking interference measurements often may drain a batter of the RC 130. Thus, the system and/or user 5 may set the frequency of interference measurements to balance the effectiveness of the interference mitigation against battery drain. In various implementations, the method 300 may repeat interference measurements once per minute, every few minutes, per hour, every few hours, once a day, upon power on, upon receiving a request for new media content, etc.

If the system 100 identifies less than an adequate number of channels below the interference threshold (or zero such channels) ("no" at 335), the method 300 may proceed to a stage 345 to select one or more of the least noisy channels using the rank-based technique as described below. Using rank-based channel selection, the method 300 may include ranking (345) the channels according to their respective corresponding interference measurements. The method 300 may include selecting (350) the N-highest ranked channels (e.g., the channels corresponding to the lowest interference measurements). The system may select multiple channels (e.g., a subset of the available channels) for transmitting the data. During transmission, the smart TV 110*a* or other transmitting device may channel hop or frequency hop between channels of the subset. Thus, the smart TV 110*a* may transmit a first portion of the data via a first channel of the subset, a second portion of the data via a second channel of the subset, and so on, cycling through the channels of the subset.

The selecting (350) may be performed in various different ways as described previously including, for example, including channels corresponding to the N-lowest interference measurements, excluding channels having the N-highest interference measurements, including channels corresponding to interference measurements below the $33^{rd}$ percentile, excluding channels corresponding to interference measurements above the $66^{th}$ percentile, etc. In some implementations, the method 300 may include updating (355) the channel information from time to time by repeating one or more of the previous stages.

In implementations where the system 100 uses measurements taken both at the RC 130 and the smart TV 110*a*, the system 100 may consider both measurements when determining whether a particular channel should be included in or excluded from a subset of the channels for potentially transmitting data. For example, the system 100 may impose a maximum threshold that if exceeded by the measurement of either the RC 130 or smart TV 110*a*, the system will exclude that channel. In some implementations, the threshold may be different for the RC 130 and the smart TV 110*a* (e.g., recognizing that interference is more problematic at the receiving device). For channels where both measurements are below the threshold (or their respective thresholds), the system 100 may consider an average of the two measurements. In some cases, the average may be weighted in favor of the RC 130. In some cases, the average may be weighted by a duty cycle of the interference on that channel (e.g., an interference measurement associated with a higher duty cycle may be weighted higher than one associated with a lower duty cycle).

In some implementations, the method 300 may include updating (355) the channel information by repeating one or more of the preceding stages. The system 100 may update the channel information by repeating the interference measurements periodically, occasionally, and/or on-demand. For example, the system 100 may update the channel information every few seconds, minutes, etc. The system 100 may update the channel information in response to various triggers such as exceeding a packet loss threshold, receiving a new request for media content, etc. The system 100 may update the channel information based on reports of a threshold number of dropped packets on that channel over a period of time, or a threshold number of dopped packets total since the channel(s) was/were selected and/or since the last interference measurement. In various implementations, operations of the method 300 may be performed in different orders and/or in parallel. In various implementations, the method 300 may include more, fewer, and/or different operations.

Figures 4A, 4B:
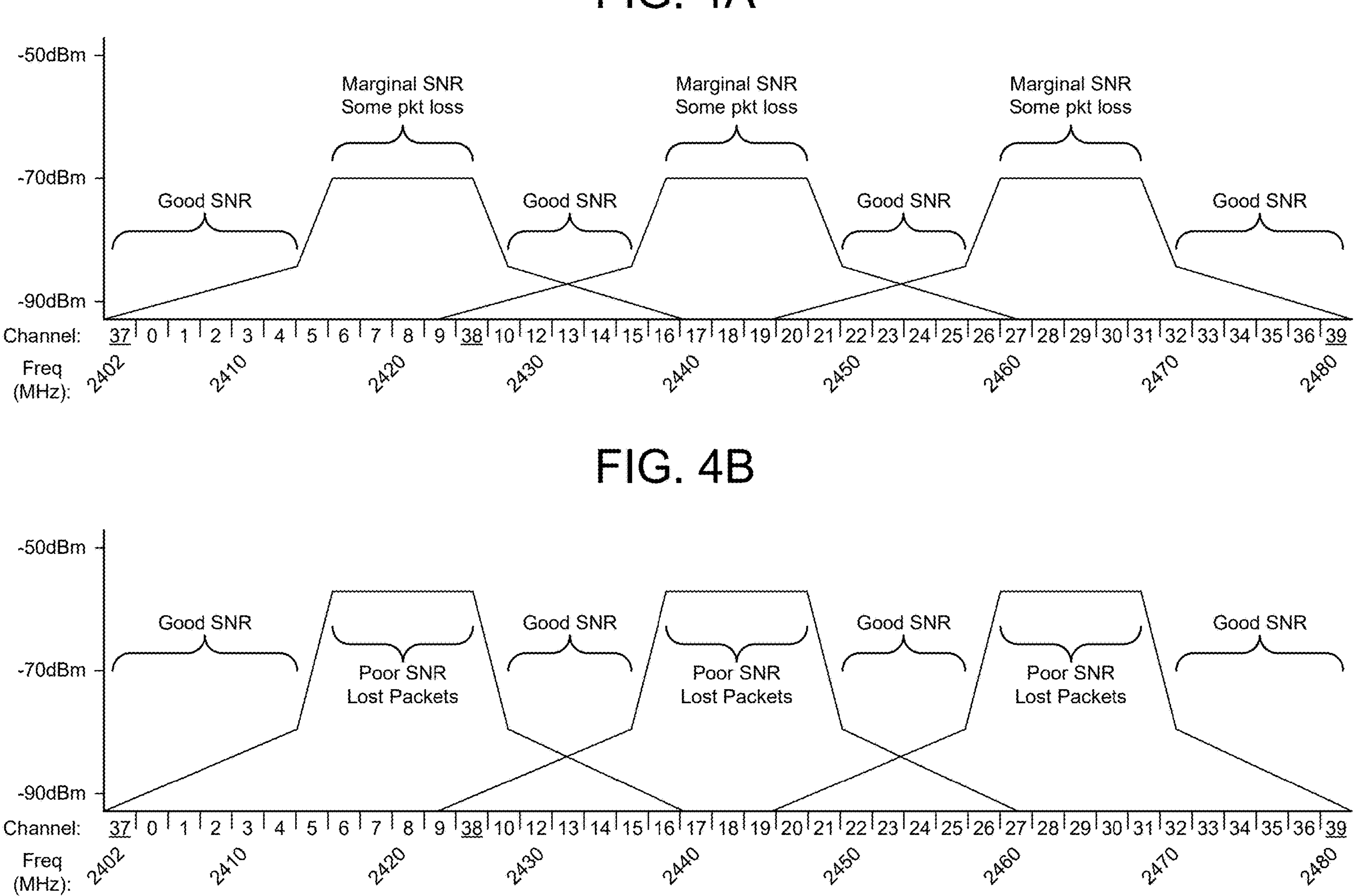
FIGS. 4A and 4B illustrate example frequency spectra showing interference levels at different channels available for data transmission, according to embodiments of the present disclosure.

FIGS. 4A and 4B illustrate example frequency spectra showing interference levels at different channels available for data transmission, according to embodiments of the present disclosure. The frequency spectra shown in FIGS. 4A and 4B correspond to channels of the BLE protocol; however, the BLE protocol is offered as an example only, and the techniques used herein may be applied to other wireless protocols using other frequency bands and channel specifications.

The frequency spectra are shown from 2,402 MHz to 2,480 MHz, which encompasses 40 BLE channels 0-39. Note, however, that the channels are not in perfect consecutive order and that channels 37-39, which are underlined, may be reserved for advertising and thus not available for transmitting a data payload such as audio data corresponding to media content. The primary advertising channels may be dispersed to avoid interference issues (e.g., such as when an interference signal interferes with multiple adjacent channels as shown in FIGS. 4A and 4B). Note that while interference measurements may be taken discretely at each channel, the example interference measurements shown in FIGS. 4A and 4B have been approximated by continuous lines and show sources of interference that overlap with other sources of interference in the frequency spectra. Relatively wider-band interference (e.g., spanning several BLE channels) as shown in FIGS. 4A and 4B may originate from a Wi-Fi access point such as the wireless AP 140 shown in FIG. 1, while narrower-band interference (e.g., spanning one or two channels) may originate from a device using the same communication protocol/channel assignment such as the smart phone 110*b* and/or smart watch 110*c*.

FIGS. 4A and 4B consider example interference thresholds of −70 dBm and −60 dBm. These values may correspond to thresholds related to an expected BLE received signal strength (RSSI) of −70 dBm at 6 meters. In various implementations, however, other thresholds may be used. In the examples shown in FIGS. 4A and 4B, there appear to be three sources of interference centered at around channels 8, 18, and 29. FIG. 4A may represent interference measurements taken by the smart TV 110*a* and FIG. 4B may represent interference measurements taken by the RC 130. The interference measurements taken by the smart TV 110*a* shown in FIG. 4A may show interference levels up to, but not exceeding, −70 dBm. At −70 dBm, using some wireless communication protocols, the channel may exhibit some packet loss; however, the smart TV 110*a* may determine that this signal-to-noise ratio (SNR) may be adequate for transmitting audio data, and may thus select some or all of the affected channels (e.g., 6-9, 16-20, and/or 27-30) for potentially transmitting audio data.

FIG. 4B reveals, however, that interference experienced at the RC 130 (and thus, by extension, the listening device 112) may exceed −60 dBm. This interference may be caused by one or more devices near the RC 130 and perhaps distant from the smart TV 110*a* (e.g., such as the wireless AP 140 and/or other devices as shown in FIG. 1). Interference at these levels may lead to significant packet loss and a potential reduction in audio quality at the affected channels, and possibly adjacent channels as well (e.g., channels 5 and 10, etc.). If the RC 130 is able to measure and report these interference levels to the smart TV 110*a* using the techniques described herein, however, the smart TV 110*a* may exclude the affected channels from use in transmitting audio data to the listening device 112. Thus, audio quality may remain high and the signal uninterrupted despite the existence of potentially problematic interference at many of the available channels.

Figure 5:
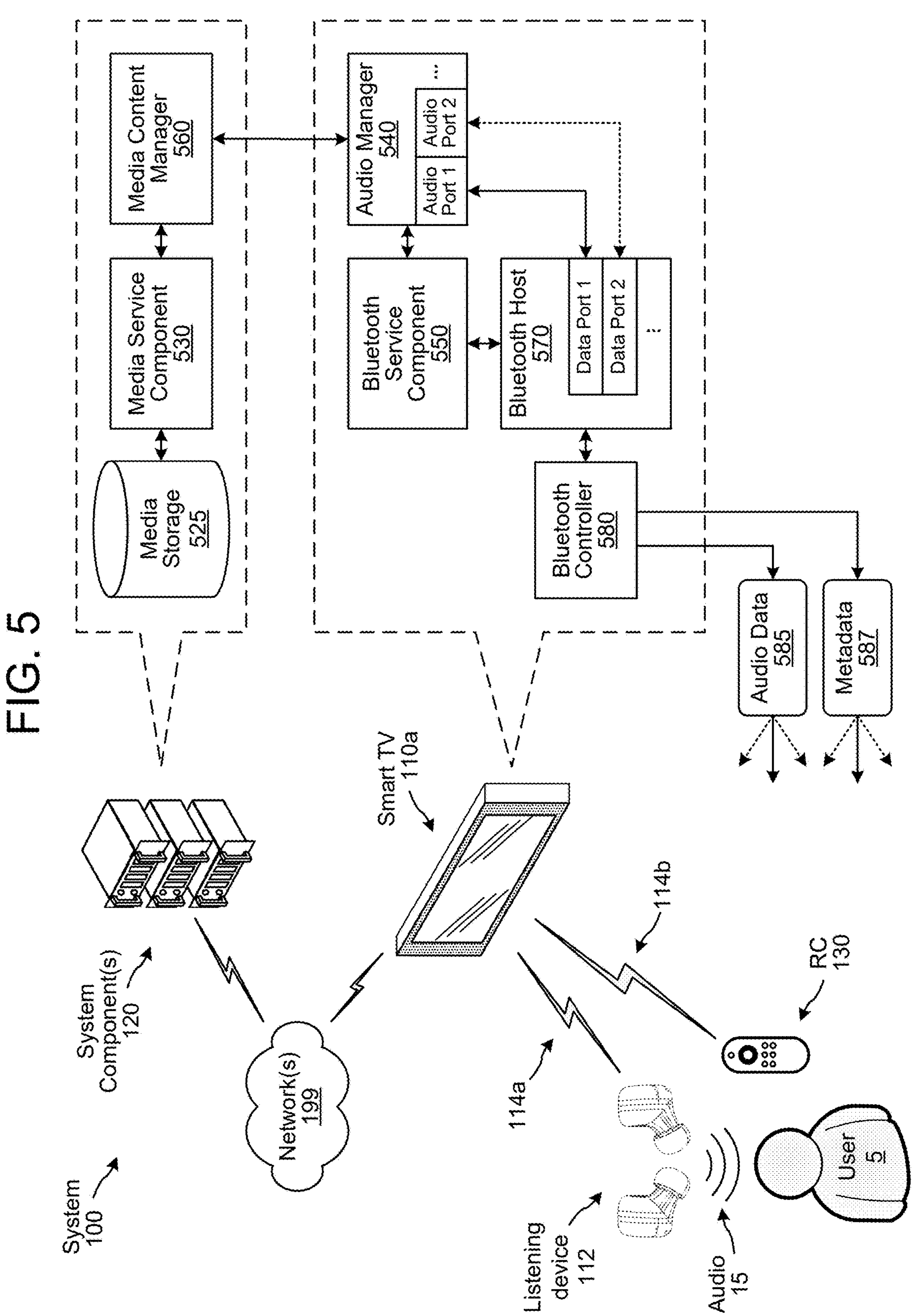
FIG. 5 is a diagram detailing example media content playback components of the system, according to embodiments of the present disclosure.
Figure 8:
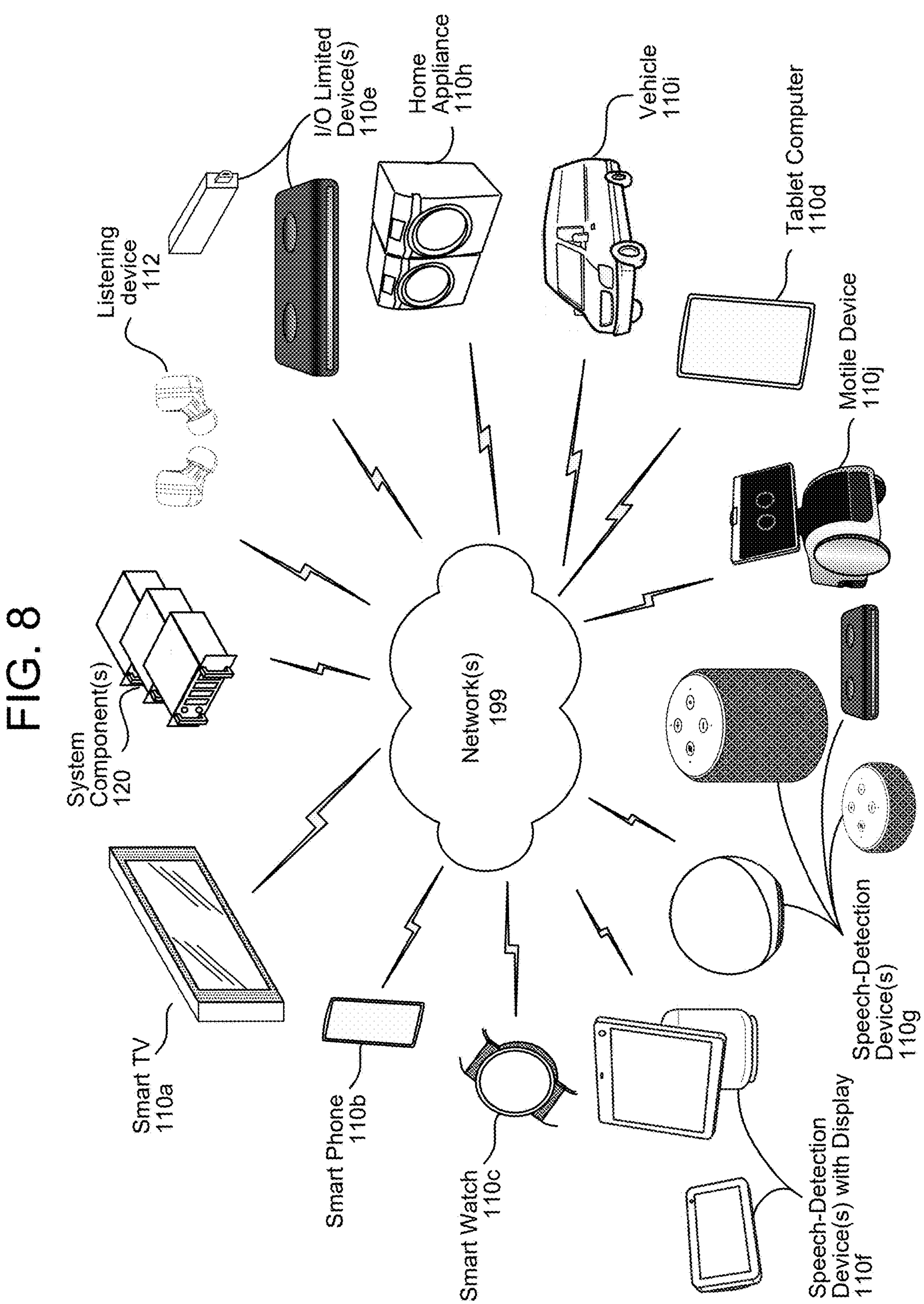
FIG. 8 illustrates an example of a computer network for use with the overall system, according to embodiments of the present disclosure.

FIG. 5 is a diagram detailing example media content playback components of the system 100, according to embodiments of the present disclosure. The system 100 may include one or more system components 120 providing media content to one or more media playback devices such as the smart TV 110*a*. The smart TV 110*a* and system component(s) 120 may communicate over one or more computer networks 199. The smart TV 110*a* may transmit audio data, via wireless signals 114, to one or more listening devices 112, which may output audio 15 to a user 5. An example hardware implementation of a smart TV 110*a* and/or a listening device 112 is described below with reference to FIG. 6. An example hardware implementation of a system component 120 is described below with reference to FIG. 7. In some implementations, the various devices and/or components of the system may communicate as shown in FIG. 8.

The user 5 may interact with the smart TV 110*a* (e.g., using the RC 130) to request media content for playback. The smart TV 110*a* may receive the media content from the system component(s) 120. The system component(s) 120 may include a media content manager 560, a media service component 530, and/or a media storage component 525. The components may include hardware, software, or a combination of hardware and software. Unless otherwise specified, the components shown in FIG. 5 may reside on a single system component 120, may be divided between two or more system components 120, and/or duplicated among two or more system components 120. Similarly, the components shown in FIG. 5 may reside on one or more system components 120, may be divided between one or more system components 120 and the smart TV 110*a*, and/or duplicated among one or more system components 120 and the smart TV 110*a*.

The system component(s) 120 may include a media storage component 525 that stores the media content for broadcast. In some implementations, however, the media content may be received live (e.g., in real time or on a brief delay via one or more video data and/or audio data feeds). The system component(s) 120 may include a media service component 530. The media service component 530 may be responsible for managing the media content available for streaming and/or currently being streamed by the system 100. The media service component 530 may handle requests for content by, for example retrieving the desired media item from the media storage component 525 and providing the audio data for the various audio content to the media content manager 560. The media content manager 560 may, upon request from the user 5, send the media content, including video data and/or audio data, etc. to the smart TV 110*a*.

The smart TV 110*a* may include an audio manager 540 and Bluetooth service component 550. The audio manager may receive the audio data corresponding to the media content from the media content manager 560. The audio manager 540 may be based on the Bluetooth standards. In some implementations, the audio manager 540 may be modified to include multiple audio ports to facilitate streaming multiple content streams (e.g., corresponding to different language feeds); for example, Audio Port 1 may be configured to receive audio data corresponding to a first audio content (e.g., in Mandarin), Audio Port 2 may be configured to receive audio data corresponding to a second audio content (e.g., in Spanish), and so on. Although FIG. 5 shows an audio manager 540 with two audio ports, in various implementations the audio manager 540 may have more or fewer audio ports. The number of audio ports may be adjusted based on the various audio content included in the media content, the available bandwidth of the system 100, etc.

The Bluetooth service component 550 may receive the audio data corresponding to the media content from the audio manager 540. In some implementations, the Bluetooth service component 550 may generate metadata 587 (e.g., advertisements) that may inform a listening device 112 of audio available for reception as well as timing information for configuring one or more radios of the listening device 112 to receive the audio data. In some implementations, the metadata 587 may list audio content available for a broadcast already in-progress such that a new listening device may join. A listening device 112 may receive the metadata 587 and allow the user 5 to join the stream and receive the audio data and/or to select a particular audio content stream to receive (e.g., based on the user's preferred language). In some implementations, the Bluetooth service component may handle incoming requests to add particular audio content to a broadcast. For example, the Bluetooth service component 550 may receive the list of available audio content from the media content manager 560. The Bluetooth service component 550 may configure the audio manager 540 and/or the Bluetooth host component 570 for adding one or more new streams of audio content to a broadcast. The media content manager 560 may indicate to the media service component 530 to send specific data associated with specific audio content to a designated audio port for broadcast.

The Bluetooth host component 570 may include a data port for each available audio content stream; for example, Data Port 1 may be configured to receive audio data corresponding to a first audio content (e.g., in Mandarin), Data Port 2 may be configured to receive audio data corresponding to a second audio content (e.g., in Spanish), and so on. Although FIG. 5 shows a Bluetooth host component 570 with two data ports, in various implementations the Bluetooth host component 570 may have more or fewer data ports. The number of data ports may be adjusted based on the number of audio content streams included in the media content, the available bandwidth of the system 100, etc. The Bluetooth host component 570 may implement a Bluetooth host protocol stack; for example, in a manner compatible with the Bluetooth standard 5.2, the Bluetooth standard 5.4, etc. The Bluetooth host component 570 may receive audio data (e.g., via a data port) that is to be broadcast by the system 100.

The Bluetooth controller 580 may format the audio data 585 and/or metadata 587 to conform to applicable standards for transmission using a Bluetooth protocol. The Bluetooth controller 580 may also handle the turning on/turning off of one or more radios associated with Bluetooth protocol transmission and reception. In some implementations, the one or more radios may be included in the smart TV 110*a*. Thus, the Bluetooth controller 580 may also control synchronization of radio activation, transmission, and reception by, for example, broadcasting timing information to the user devices 110 and/or listening devices 112 and then transmitting and receiving at the specified times. The Bluetooth controller 580 may implement a Bluetooth host protocol stack; for example, in a manner compatible with the Bluetooth standard 5.2, the Bluetooth standard 5.4, etc.

In some implementations, the system 100 may implement one or more Bluetooth standards. For example, the Bluetooth controller 580 may operate according to the Bluetooth 5.2 standard. The Bluetooth host component 570 may operate according to the Bluetooth 5.3 standard. In some implementations, the system 100 may generate and transmit the metadata 587 according to the Bluetooth 5.4 standard. In various implementations, other standards may be implemented.

In some implementations, the system component(s) 120 may communicate with the smart TV 110*a* over one or more computer networks 199 as shown in FIGS. 1 and 5. For example, the system component(s) 120 may reside on a back-end server that transmits content via the Internet to a different location, where the smart TV 110*a* transmits the content to one or more nearby user devices 110 and/or listening devices 112. In some cases, the system component (s) 120 and the smart TV 110*a* may have a direct connection via, for example, ethernet, USB, etc.

The media content may be a live and/or prerecorded event such as a movie, classroom lecture, sporting event, television show, etc. The audio data 585 may represent audio content of the requested media content. In some cases, the audio content may correspond to, for example, a first spoken language (e.g., Mandarin). In some implementations, the wireless protocol used by the smart TV 110*a* may allow for sending multiple streams of audio data. For example, the requested media content may include additional audio content; for example, corresponding to different spoken languages (e.g., Spanish). As used herein and unless otherwise specified, the term "audio content" may refer to audio data corresponding to a particular language, feed, source, etc. Audio content may include multiple channels, such as left and right channels for stereo audio, center and rear channels for surround-sound, etc. Thus, in some cases, the smart TV 110*a* may, when sufficient bandwidth is available, simultaneously transmit both first language audio content and second language audio content.

In some implementations, the metadata 587 may represent, for example, an advertisement such as a Periodic Advertisement with Response (PAwR) as described in the Bluetooth specification 5.4. In some implementations, the metadata 587 may be formatted include one or more subevents. The metadata 587 may include, in its payload, the available audio content (e.g., languages) available for the media item. A subevent may have one or more audio content descriptions each, depending on how much data is used to describe the audio content. For each subevent, a subevent response slot may be available. A listening device 112 may use the subevent response slot to request particular audio content not currently broadcast by the system 100. For example, if the system 100 is broadcasting media content with three choices of audio content available, the media content manager 560 may create metadata 587 having three subevents, with each subevent having one subevent response slots. A period of the subevent may be configured based on the latency versus power consumption of the desired use case. For example, a subevent may be sent every two seconds, which may introduce a modest but acceptable amount of latency while keeping system overhead low in terms of bandwidth and processor usage.

In some implementations, the smart TV 110*a* may send separate metadata 587 (e.g., separate advertisements) for different audio content and/or for advertising capabilities relating to its performance as a secondary device. In some implementations, the smart TV 110*a* may send metadata 587 (e.g., a single advertisement) listing all available audio content. Listing all available audio content using a single advertisement may preserve bandwidth. In some implementations, the metadata 587 may include a payload that represents the available language as a bitmap; for example, a binary 1 may correspond to a first language, 2 may correspond to a second language, 4 may correspond to a third language, etc.

Prior to and/or during transmission of the audio data 585, the system 100 may measure interference at some or all of the channels available for transmitting the audio data. The system 100 may select one or more channels for potentially sending the audio data 585, and send an indication of the selected channels to the Bluetooth controller 580. The Bluetooth controller 580 may use one or more of the selected channels for transmitting the audio data 585 to the listening device 112 (and/or to broadcast the audio data 585 over a one-to-many protocol for any listening devices 112 within range to receive).

In some implementations, a user 5 may receive the audio data 585 and/or metadata 587 at a user device 110. In some implementations, the user device 110 may display a list or menu of available audio content, and the user 5 may manually select their desired audio content from the list (e.g., via a graphical user interface (GUI)). In some implementations, the user device 110 may begin receiving audio data 585 corresponding to the selected audio content, and send the audio data 585 to the listening device 112 for output as audio 15.

In some implementations, the system 100 may include one or more features to make efficient use of the bandwidth available to the system (e.g., the transmission capabilities of the smart TV 110*a* and/or the wireless band/channel it is using). For example, the smart TV 110*a* may begin broadcasting a media item with no audio content or only first audio content until and/or unless additional audio content is requested. A listening device 112 and/or user device 110 that is receiving the audio data 585 may continue to request the desired audio content (e.g., ever few seconds, few minutes, etc.). The system component(s) 120 may receive the requests (e.g., via the smart TV 110*a*) and continue broadcasting the audio content until and/or unless it does not receive a request for the audio content for a length of time (e.g., 30 seconds, a minute, etc.). If the system component(s) determines that particular audio content has not be requested by any listening devices 112 or user devices 110 for a given length of time, the system component(s) 120 may cease broadcasting that audio content.

FIG. 6 is a block diagram conceptually illustrating an example device such as a user device 110, listening device 112, and/or RC 130 that may be used with the system 100. FIG. 7 is a block diagram conceptually illustrating example components of a system component 120. A system component 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/ components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110, listening device 112, and/or RC 130 may operate locally to a user (e.g., within a same environment so the device may receive inputs and playback outputs for the user) the system component(s) 120 may be located remotely from the user device 110 as its operations may not require proximity to the user. The system component(s) 120 may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Each of these components (110/112/120/130) may include one or more controllers/processors (604/704), which may each include a central processing unit (CPU) for processing data and computer-readable instructions, and a memory (606/706) for storing data and instructions of the respective device. The memories (606/706) may individually include volatile random-access memory (RAM), non-volatile read only memory (ROM), non-volatile magnetoresistive memory (MRAM), and/or other types of memory. Each component (110/112/120/130) may also include a data storage component (608/708) for storing data and controller/processor-executable instructions. Each data storage component (608/708) may individually include one or more non-volatile storage types such as magnetic storage, optical storage, solid-state storage, etc. Each component (110/112/120/130) may also be connected to removable or external non-volatile memory and/or storage (such as a removable memory card, memory key drive, networked storage, etc.) through respective input/output device interfaces (602/702).

Computer instructions for operating each component (110/112/120/130) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each component (110/112/120/130) includes input/output device interfaces (602/702). A variety of components may be connected through the input/output device interfaces (602/702), as will be discussed further below. Additionally, each component (110/112/120/130) may include an address/data bus (624/724) for conveying data among components of the respective device. Each component within a component (110/112/120/130) may also be directly connected to other components in addition to (or instead of) being connected to other components across the bus (624/724).

Referring to FIG. 6, the user device 110 may include input/output device interfaces 602 that connect to a variety of components such as an audio output component such as a speaker 612, a wired headset or a wireless headset (not illustrated), or other component capable of outputting audio. The user device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 616 for displaying content. The user device 110 may further include a camera 618.

Via antenna(s) 622, the input/output device interfaces 602 may connect to one or more networks 199 via a wireless local area network (WLAN) (such as Wi-Fi) radio, Bluetooth Classic, BLE, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the user device 110, listening device 112, the system component(s) 120, and/or RC 130 may include their own dedicated processors, memory, and/or storage. Alternatively, one or more of the components of the user device 110, listening device 112, the system component(s) 120, and/or RC 130 may utilize the I/O interfaces (602/702), processor(s) (604/704), memory (606/706), and/or storage (608/708) of the user device 110, listening device 112, the system component(s) 120, and/or RC 130, respectively.

As noted above, multiple devices may be employed in a single system 100. In such a multi-device system, each of the devices may include different components for performing different aspects of the system's processing. The multiple devices may include overlapping components. The components of the user device 110, listening device 112, the system component(s) 120, and/or RC 130, as described herein, are illustrative, and may be located as a stand-alone device or may be included, in whole or in part, as a component of a larger device or system. As can be appreciated, a number of components may exist either on the user device 110, listening device 112, the system component(s) 120, and/or RC 130. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 8, multiple devices (110*a*-110*j*, 112, 120) may contain components of the system and the devices may be connected over a network(s) 199. The network(s) 199 may include a local or private network or may include a wide network such as the Internet. Devices may be connected to the network(s) 199 through either wired or wireless connections. For example, a smart TV 110*a*, a smart phone 110*b*, a smart watch 110*c*, a tablet computer 110*d*, an I/O limited user device 110*e*, a speech-detection device with display 110*f*, a speech-detection user device 110*g*, a home appliance 110*h* (e.g., a washer/dryer, refrigerator, dishwasher, microwave, etc.), a vehicle 110*i*, autonomously motile user device 110*j* (e.g., a robot), a listening device 112, etc., may be connected to the network(s) 199 through a wireless service provider, over a Wi-Fi or cellular network connection, or the like. Other devices are included as network-connected support devices, such as the system component(s) 120, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:

receiving, by a media device, a first request for media content;

receiving, by the media device from a remote-control device, first data including at least a first value representing a first measurement of interference corresponding to a first wireless communication channel and a second value representing a second measurement of interference corresponding to a second wireless communication channel;

determining, based on at least the first data, to send audio data via the first wireless communication channel; and based on the determining to send audio data via the first wireless communication channel, sending first audio data corresponding to the media content via the first wireless communication channel.

2. The method of claim 1, further comprising:

prior to receiving the first data, causing the remote-control device to measure interference corresponding to at least the first wireless communication channel and the second wireless communication channel using a Bluetooth Low Energy (BLE) radio of the remote-control device.

3. The method of claim 1, further comprising:

determining, using a Bluetooth Low Energy (BLE) radio of the media device, second data representing at least a third value representing a third measurement of interference corresponding to the first wireless communication channel and a fourth value representing a fourth measurement of interference corresponding to the second wireless communication channel, wherein determining to send the first audio data via the first wireless communication channel is additionally based on the second data.

4. The method of claim 1, further comprising:

prior to receiving the first data, receiving, by the media device, an indication that the remote-control device is being used; and in response to receiving the indication, causing the remote-control device to measure interference corresponding to at least the first wireless communication channel and the second wireless communication channel.

5. The method of claim 1, wherein a plurality of wireless communication channels available for transmitting audio data include at least the first wireless communication channel and the second wireless communication channel, the method further comprising:

determining, based on at least the first value and the second value, a subset of the plurality of wireless communication channels for potentially transmitting audio data, the subset including the first wireless communication channel and excluding the second wireless communication channel.

6. The method of claim 1, further comprising:

receiving a second request for wireless transmission of the first audio data to at least a first listening device; and in response to receiving the second request, causing the remote-control device to measure interference corresponding to at least the first wireless communication channel and the second wireless communication channel using a BLE radio of the remote-control device.

7. The method of claim 1, further comprising:

ranking, using at least the first data, a plurality of wireless communication channels available for transmitting audio data based on respective measurements of interference;

determining a number of wireless communication channels for potentially transmitting audio data; and determining, based on the ranking and the number, a subset of the plurality of wireless communication channels having lowest measurements of interference, the subset including the first wireless communication channel.

8. The method of claim 1, further comprising:

receiving a third value representing a threshold interference level;

determining, using the first data, that none of a plurality of wireless communication channels available for transmitting audio data correspond to a measurement of interference below the threshold interference level; and in response to determining that none of a plurality of wireless communication channels correspond to a measurement of interference below the threshold interference level, determining a subset of the plurality of wireless communication channels having lowest measurements of interference for potentially transmitting audio data, the subset including the first wireless communication channel.

9. The method of claim 1, wherein a plurality of wireless communication channels available for transmitting audio data include at least the first wireless communication channel and the second wireless communication channel, the method further comprising:

receiving a third value representing a threshold interference level; and determining, using the first data and the third value, a subset of the plurality of wireless communication channels for potentially transmitting audio data, the subset corresponding to measurements of interference below the threshold interference level, the subset including the first wireless communication channel.

10. The method of claim 9, wherein the first wireless communication channel is a BLE channel, and the media device sends the first audio data via the first wireless communication channel according to a BLE protocol.

11. The method of claim 1, wherein the media device is a television.

12. The method of claim 1, wherein the media device is a streaming media player device connected to a television.

13. The method of claim 1, wherein the media device is a streaming stick device.

14. An electronic device comprising:

at least one processor; and at least one memory comprising instructions that, when executed by the at least one processor, cause the electronic device to:

receive, from a remote-control device, first data including at least a first value representing a first measurement of interference corresponding to a first wireless communication channel and a second value representing a second measurement of interference corresponding to a second wireless communication channel;

determine, based on at least the first data, to send audio data corresponding to media content via the first wireless communication channel; and send first audio data via the first wireless communication channel.

15. The electronic device of claim 14, wherein the at least one memory further comprises instructions that, when executed by the at least one processor, further cause the electronic device to:

prior to receiving the first data, cause the remote-control device to measure interference corresponding to at least the first wireless communication channel and the second wireless communication channel using a Bluetooth Low Energy (BLE) radio of the remote-control device.

16. The electronic device of claim 14, wherein the at least one memory further comprises instructions that, when executed by the at least one processor, further cause the electronic device to:

determine, using a Bluetooth Low Energy (BLE) radio of the electronic device, second data representing at least a third value representing a third measurement of interference corresponding to the first wireless communication channel and a fourth value representing a fourth measurement of interference corresponding to the second wireless communication channel, wherein determining to send audio data via the first wireless communication channel is additionally based on the second data.

17. The electronic device of claim 14, wherein the at least one memory further comprises instructions that, when executed by the at least one processor, further cause the electronic device to:

prior to receiving the first data, receive an indication that the remote-control device is being used; and in response to receiving the indication, cause the remote-control device to measure interference corresponding to at least the first wireless communication channel and the second wireless communication channel.

18. The electronic device of claim 14, wherein the at least one memory further comprises instructions that, when executed by the at least one processor, further cause the electronic device to:

rank, using at least the first data, a plurality of wireless communication channels available for transmitting audio data based on respective measurements of interference;

determine a number of wireless communication channels for potentially transmitting audio data; and determine, based on the ranking and the number, a subset of the plurality of wireless communication channels having lowest measurements of interference, the subset including the first wireless communication channel.

19. The electronic device of claim 14, wherein the at least one memory further comprises instructions that, when executed by the at least one processor, further cause the electronic device to:

receive a third value representing a threshold interference level;

determine, using the first data, that none of a plurality of wireless communication channels available for transmitting audio data correspond to a measurement of interference below the threshold interference level; and in response to determining that none of a plurality of wireless communication channels correspond to a measurement of interference below the threshold interference level, determining a subset of the plurality of wireless communication channels having lowest measurements of interference for potentially transmitting audio data, the subset including the first wireless communication channel.

20. The electronic device of claim 19, wherein the first wireless communication channel is a BLE channel, and the electronic device sends the first audio data via the first wireless communication channel according to a BLE protocol.

* * * * *